United States Patent [19]

Tanaka et al.

[11] Patent Number: 5,369,507
[45] Date of Patent: Nov. 29, 1994

[54] IMAGE PROCESSING APPARATUS AND METHOD CAPABLE OF DISCRIMINATING BETWEEN CHARACTER/PHOTOGRAPH AREAS BY FINDING BLANK-STRIPE ZONES AND DIVIDING THE AREAS INTO BLOCKS

[75] Inventors: Kazuyoshi Tanaka; Koji Washio; Yoshizumi Yasuda, all of Tokyo, Japan

[73] Assignee: Konica Corporation, Tokyo, Japan

[21] Appl. No.: 932,319

[22] Filed: Aug. 19, 1992

[30] Foreign Application Priority Data

Sep. 3, 1991 [JP] Japan .................................. 3-223005

[51] Int. Cl.$^5$ ............................................. H04N 1/40
[52] U.S. Cl. ..................................... 358/462; 382/50; 358/456
[58] Field of Search ............... 358/462, 455, 456, 457, 358/296; 382/9, 50

[56] References Cited

U.S. PATENT DOCUMENTS 4,503,556  3/1985  Scherl et al. ........................... 382/9
5,119,207  6/1992  Nitsuma et al. ...................... 358/296

*Primary Examiner*—Mark R. Powell
*Assistant Examiner*—Cheryl Cohen
*Attorney, Agent, or Firm*—Frishauf, Holtz, Goodman & Woodward

[57] ABSTRACT

An image processing apparatus and method selects a processing mode to be one of a character image processing mode and a picture image processing mode in accordance with an image texture in an original image. The apparatus and method uses a scanner which pre-scans an original image to obtain sampled image data, a judging means discriminates between a character image area and a picture image area in an area of the original image based on an analysis of the sampled image data. The apparatus and method the original image processing mode from a character image processing mode to a picture image processing mode and vice versa based on the discrimination by the judging means. During discrimination, the judging means finds blank-stripe zones in an area of the original image based on an analysis of the sampled image data, and divides the area into image blocks by splitting the area with the blank-stripe zones therein and ascertains whether the original image in each block is a character image or a picture image based on a ratio between the length and the width of each image block.

6 Claims, 6 Drawing Sheets

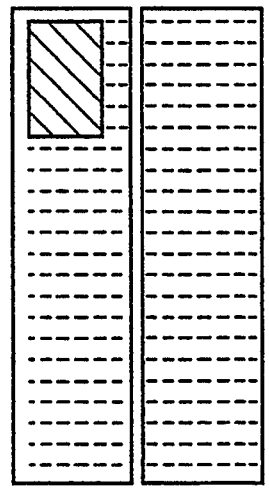
FIG. 1-a
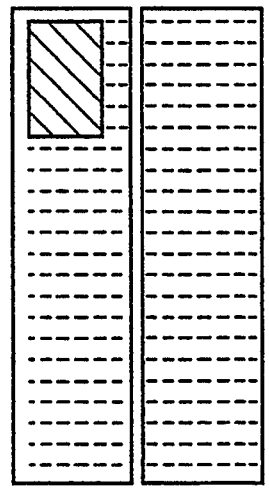
FIG. 1-c
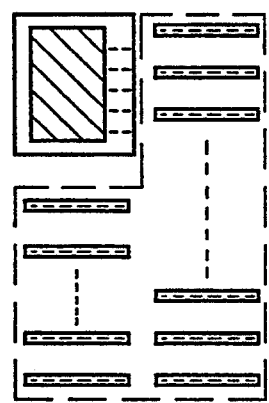
FIG. 1-d
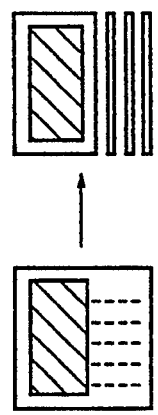
FIG. 1-e

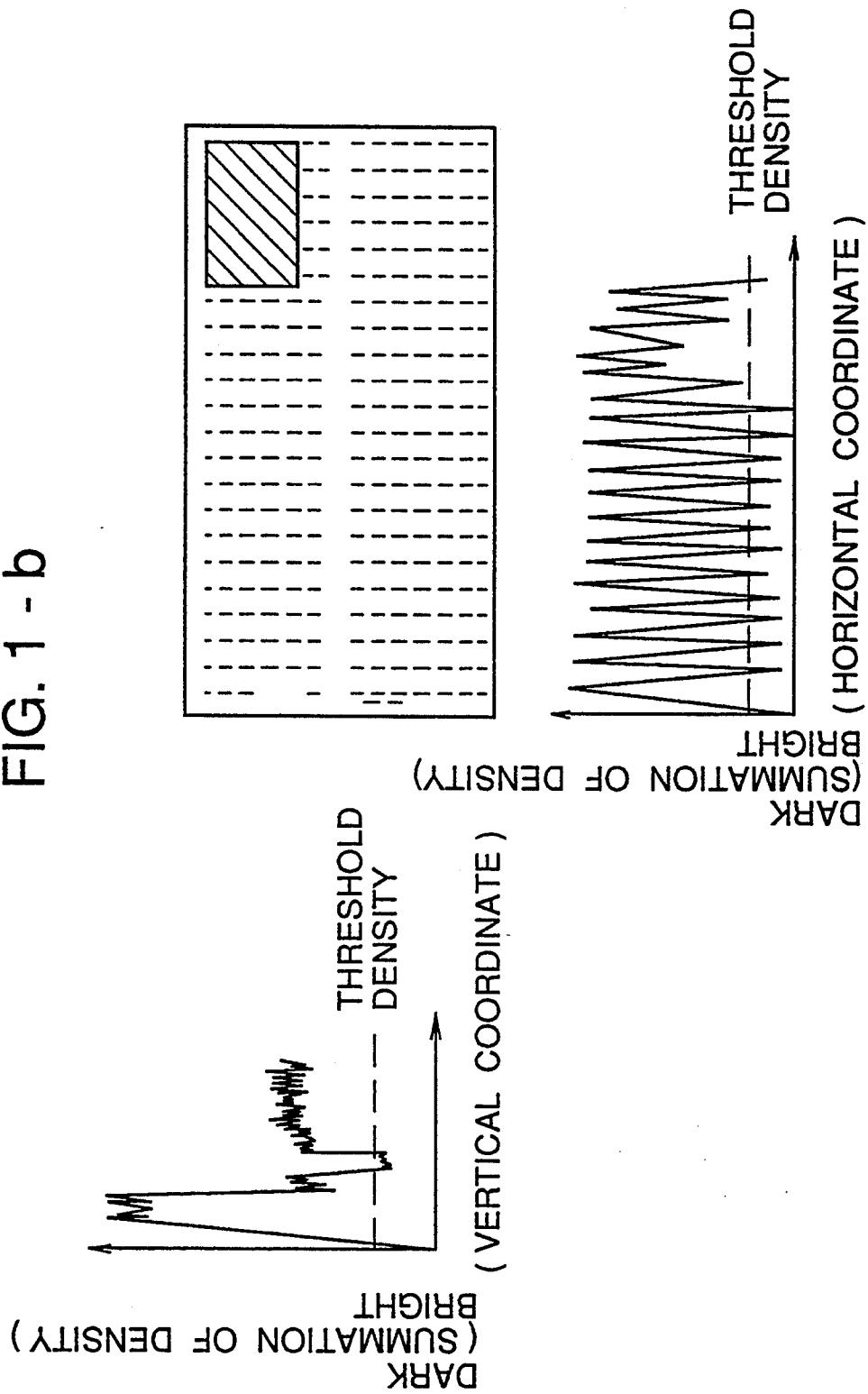
FIG. 1-b

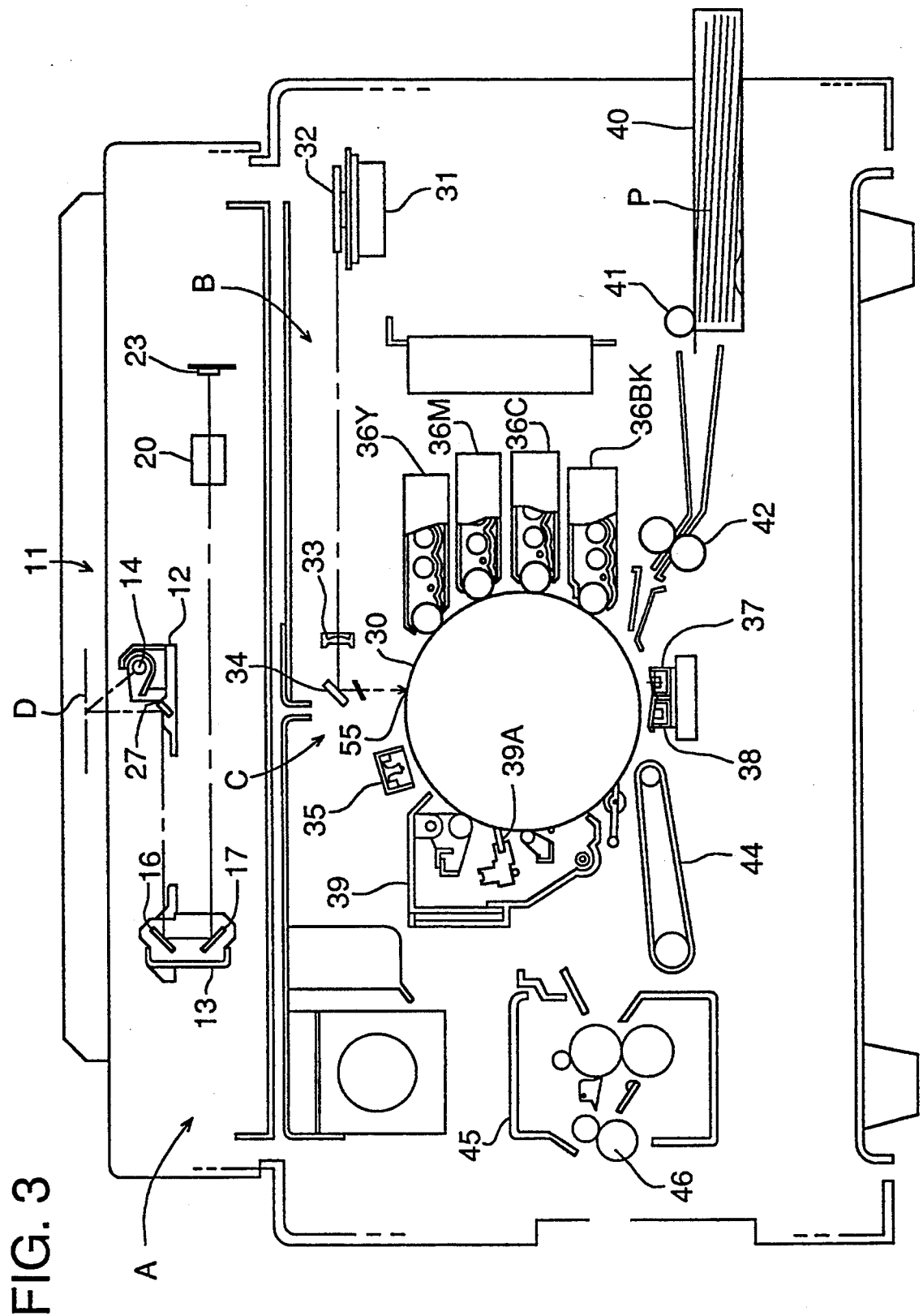

IMAGE PROCESSING APPARATUS AND METHOD CAPABLE OF DISCRIMINATING BETWEEN CHARACTER/PHOTOGRAPH AREAS BY FINDING BLANK-STRIPE ZONES AND DIVIDING THE AREAS INTO BLOCKS

BACKGROUND OF THE INVENTION

The present invention relates to an image processing method and apparatus, such as a scanner into which a document image is digitally read by a CCD element and the like and from which the image is outputted, a copying apparatus and a facsimile using the scanner, and especially relates to an image processing apparatus by which the characteristic of the image is selected, and from which the image is outputted while processing is selectively changed even in one image plane.

Recently, as the amount of information which is exchanged and transmitted has increased, an enormous amount of printed documents are further copied and transmitted by a copying apparatus or facsimile. In the image which is copied and transmitted as described above, documents in which different textures such as characters and pictures are mixed, have also increased. In the copying apparatus and facsimile which read in, process and output images, it is more advantageous for an increase of the output image quality and the transmission efficiency to process them and change-over parameters of processing according to the texture of these images. For example, in the copying apparatus, it is necessary to change-over a gamma correction unit or a filter according to a character or a photographic image, and in the facsimile, it is necessary to change-over a coding method. Accordingly, a mechanism which selects an image characteristic automatically and outputs it at each pixel with image data, is required for a processing apparatus.

Various kinds of these discrimination methods have been proposed conventionally. However, in many cases, these are methods in which the image is divided into small areas, and image characteristics are successively judged by a small window. In these cases, the image can be processed without observing the entire image, and therefore, approximates real time processing can be conducted. However, there are many types of apparatus in the prior art which detect the character image basically by a space differentiation (an edge finding procedure) conducted in the window, and thereby there is a tendency that an error occurs frequently in which a halftone image is misjudged as a character image depending on a read-out resolution.

SUMMARY OF THE INVENTION

The object of the present invention is to provide an image forming method and apparatus in which exact judgement can be made, depending on a broader judgement and not depending on a conventional method in which a document image is partially judged.

In order to accomplish the object of the present invention, the present invention provides an image processing apparatus in which a document image is scanned so that image processing is conducted, which is characterized in that: an entire original image is pre-scanned prior to scanning; data obtained by pre-scanning is projected and added in a primary scanning direction and a subsidiary scanning direction; a marginal section is detected from density of the projected and added section obtained by the foregoing projection and addition; the image is divided into blocks; a divided block is again projected and added, and is further divided into smaller blocks; a ratio of a length and a width of the block obtained by the foregoing repetition is calculated; whether the image is a character image or a picture image is judged based on whether the ratio of the length and width is more than a predetermined value, or not; and image processing of the data obtained by scanning is conducted according to the foregoing Judgement.

In the image processing method of the present invention, the entire image is previously scanned, and thereby the image is roughly divided. Specifically, a blank (a margin) section of the image is targeted and the image is roughly divided, and after that, the characteristic of the image is selected. Although this method requires a memory unit in which the result which has been read out previously is stored, the capacity of the memory is sufficient if it is one-several hundredths of the actual memory capacity because it is no problem that the reading-out operation is roughly culled out, compared with the actual reading-out operation. Further, an actual human reading-out method can be considered to include the following: the image is not judged at the small region; the image is divided by targeting the blank sections of the document; and after that, each region is judged. Therefore, the image processing method of the present invention is structured to be close to how an actual human being judges a page having pictures and data thereon.

The image processing system of the present invention is generally composed of: ①scanner; ②memory in which image/discrimination data is stored; and ③CPU by which discrimination is conducted according to image data which is stored by pre-scanning and the result is stored in the memory again. The image processing system conducts pre-scanning, calculation, and main scanning.

(1) When pre-scanning is conducted:

Image data is stored in the memory when pre-scanning is conducted. It is sufficient that the general characteristics of the image can be discriminated, as described above, and that reading-out intervals are culled out and the number of bits is decreased. For example, when the number of dots is 16 dots/mm 8 bits per each RGB in main scanning, it is sufficient that the number of dots in sampling is about 1 dot/mm 6 bits. As a result of that, the memory capacity is sufficient if it is between one-ten thousandth and one-twenty thousandth of the memory capacity used in the actual operation, and the capacity can be fully put to practical use.

(2) When calculation is conducted:

The discrimination calculation is conducted according to this pre-scanned data, and the result (character, photography) is returned to the memory again. The calculation can be completed in several seconds when an algorithm, which will be described later, is used, and thereby main scanning can be conducted without waiting for a long time before operation. This system is structured as described above, and therefore dedicated hardware is not necessary except for the CPU, and the structure is simple, and a change of algorithm and other parameters can be easily conducted. The CPU of the system may be structured as an independent structure, or the scanner or a control CPU may be used as the CPU.

(3) When main scanning is conducted:

When main scanning is conducted, the discrimination data is transferred in timed relation with the image data. When the pre-scanning operation has been conducted by being culled out, data in the vicinity of a scanned point is transferred as the same discrimination data as that of the scanned point. When this discrimination data is used for subsequent processing speed, higher processing can be conducted and high quality output can be obtained.

BRIEF DESCRIPTION OF THE DRAWINGS

FIG. 1-a, 1-b, 1-c, 1-d and 1-e are illustrations showing procedures for discriminating a document image.

FIG. 3 is a view showing a structure of a color image forming apparatus to which the present invention is applied.

DETAILED DESCRIPTION OF THE INVENTION

Figure 2:
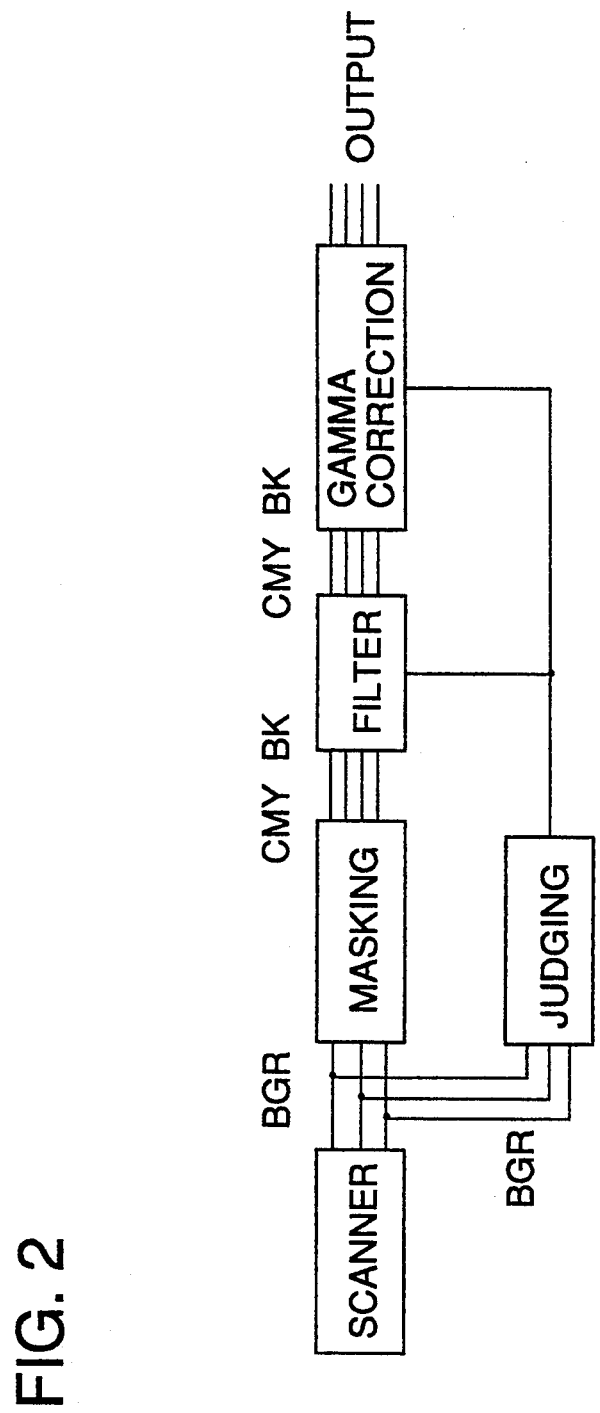
FIG. 2 is a circuit diagram showing an example of a structure of the present invention.

Referring to FIG. 1, the algorithm of the present invention will be described in detail as follows. FIG. 1-a, and FIG. 1-b are illustrations which show procedures for dividing the original image into blocks, and FIG. 1-a shows an example of a document in which characters and pictures are generally mixed, and the upper right portion of the drawing is defined as a picture region. Such an image can often be seen in ordinary papers or materials in all lengths and widths. The document as described above can be divided into several sections by a belt of blank sections or (blank-stripes).

When such an image is read out by the scanner, normally the direction of length and width of the image is set to a scanning direction, and scarcely is the image set to the oblique direction.

(STEP 1)

At first, an integration histogram is made in which image data is projected and added in the horizontal direction and vertical direction. (FIG. 1-b)

In this case, it is a matter of course that the operation may be conducted under the condition that sampling is culled out.

The integration histogram is a histogram in which data of a line or a row is accumulated, and it is stored in another buffer memory separately provided from that for the image data. It is a matter of course that the memory capacity required for the operation is very small. The number of blank stripes is detected horizontally and vertically. For this purpose, data of the integration histogram is binarized by a predetermined threshold value, and the crossing number in which data crosses the threshold value from the dark direction to the bright direction is detected. This threshold value may be a constant value, and further it may be calculated from the result of the total of whole integrated data. Namely, when whole data are bright, the threshold value has a bright value, and when whole data are dark, the threshold value has a dark value.

(STEP 2)

As a result of the detection of the blank-stripes, the image region is divided into blocks at first in the direction in which the number of the divided region is smaller. In this example, the foregoing is shown in FIG. 1-c. This comes from the following reason: the method by which the region is divided from the larger region into the smaller region successively, is used. In this case, the minimum region is 0, which means a sentence composed of one vertical line (or horizontal row) which has no blank-stripes.

(STEP 3)

In regions (blocks) divided in STEP 2, projection is conducted in the direction perpendicular to the direction of division used in STEP 2, the blank stripe is detected and after that, the region is divided. When a square region (a block) is long and narrow, the region (the black) is regarded as a character line or a blank area. In this case, the region (the block) is discriminated as a character region. The ratio of the length and width of the square region (block) is used for a parameter for the discrimination. As a result of investigation, the following was found: when the ratio is less than $\frac{1}{3}$ or larger than 3, the region can be discriminated as a character region. This is due to the fact that such long and narrow regions do not generally exist.

When the ratio is not larger than 1 to 3, the region is considered to be a picture region, or the region in which a character and a picture exist together, and therefore, the operation advances to the next step.

FIG. 1-d shows this condition, and character rows are separated from the entire region, and the region in which the character and the picture exist together, remains partially.

(STEP 4)

The region in which the character and the picture exist together, and which remained in STEP 3, is divided into blocks again. The projection at the time is conducted in the direction perpendicular to that of STEP 3, that is, the same direction as that of STEP 2. When the ratio of the two sides of the square region (block) which is divided in the same way as that of STEP 3, is not less than 1 to 3, the region is discriminated as a character region, and the other region (block) is discriminated as a picture region. Due to the aforementioned processing, the entire region is divided into small regions composed of characters or pictures.

FIG. 1-e shows this condition, and the condition in which the picture region and the character region are discriminated again.

(STEP 5)

In the region divided as described above, the ratios of R, G, and B components of the pixel are compared with a predetermined value. When the ratios of the R, G, B components are the same as each other in some range of the value, the region is discriminated as gray (monochrome), and when the ratios are different from each other, the region is discriminated as a color image.

Next, a structure of an image processing mechanism of the present invention will be described as follows. FIG. 2 shows an example of the present invention. Image data which is read in by pre-scanning is culled out and transmitted to a discrimination means. In the discrimination circuit, the image is discriminated to be a character or a picture, and further, color or monochrome. This result is temporarily stored in a discrimination memory which is composed of 2 bits at the most, and is not required to have so large a capacity since the image data is culled out. In main scanning, data which is converted to a CMYK (Cyan, Magenta, yellow and Black) signal by a masking operation, is transmitted to an output means (a thermal printing device, an electrophotographic device and the like) through a filter, a gamma correction unit and the like. The CMYK signal at the time may be transmitted in series corresponding to four times scanning, or in parallel at one time so that the signal is used for the output device.

In this case, discrimination data obtained by the discrimination means, is synchronously transmitted to subsequent processing units. At this time, since the result of the discrimination is culled out, data in the vicinity of that of the objective pixel is outputted as the same data as that of the objective pixel in the result of the output discrimination. For example, when a scanning density of 16/mm is culled out to 1/mm in pre-scanning, that is, scanning density is decreased to 1/16, the following interpolation is conducted: serial 16 pixels has the same discrimination result in the primary and subsidiary scanning. Actually, there is no possibility that region discrimination is required for the region which is in the range not larger than 1 mm, and therefore, there is no possibility that the result is deteriorated by such a culling-out and interpolation.

This discrimination result is used for subsequent processing such as filter processing and the like in real time (at each pixel). For example, in filter processing, a digital high-pass filter for a character, and another digital high-pass filter for a picture are prepared, and they are changed over according to the discrimination result on a real time basis. Further, in processing such as gamma correction processing and the like, the discrimination result is used similarly. Further, image compression or an electric transmission method is changed according to the discrimination result so that they can be controlled to conduct more appropriate processing, which is not shown in this example.

In an example in which an image processing apparatus of the present invention is applied to a color image forming apparatus by an electrophotographic method, the general structure and its operation will be described as follows.

FIG. 3 is a sectional view showing an example of the color image forming apparatus. The image forming apparatus is composed of: an image reading system A; a laser writing system B; and an image forming section C.

On the upper section of the image forming apparatus, there is provided a document placement section 11 which is composed of a platen composed of a transparent glass plate, and a platen cover which covers document D placed on the platen. In the lower section of the platen, that is, in the apparatus main body, there is provided the image reading system A which is composed of a first mirror unit 12, a second mirror unit 13, a main lens 20, a color CCD 23, and the like. The first mirror unit 12 has an exposure lamp 14, and a first mirror 15. The first mirror unit 12 is mounted in the following manner: the unit 12 is mounted in parallel with the platen; and the unit 12 can linearly travel in the left and right direction in the drawing so that the entire surface of the document D can be optically scanned. The second mirror unit 13 is integrally provided with a second mirror 16 and third mirror 17, and linearly travel in the left and right direction, which is the same direction as the first mirror unit 12, at a half speed of the first mirror unit 12 so that a predetermined optical path length is always maintained. Of course, the second mirror unit 13 travels in parallel with the platen in the same way as the first mirror unit 12. An image of the document D on the platen which is illuminated by the exposure lamp 14, is image-formed on a color CCD 23 by a main lens 20 through the first mirror 15, the second mirror 16, and the third mirror 17. The scanning operation is described as the foregoing, and when the scanning is completed, the first mirror unit 12 and the second mirror unit 13 are retreated to the original positions, and prepare for the next copying cycle.

The image data of each color obtained by the color CCD 23 is image-processed and outputted from the laser writing system B as an image signal.

The image forming section C is composed of a charger 35, an image exposing section 55, developing units 36Y, 36M, 36C, and 36K, a transfer unit 37, a cleaning unit 39 which are provided around the periphery of a photoreceptor drum 30, which is an image forming body, and is composed of a sheet feed cassette 40, a conveyance belt 44 and a fixing unit 45 which are provided near the photoreceptor drum 30.

In the developing units 36Y, 36M, 36C and 36BK, the developing unit 36Y is provided on the most upstream section of the periphery of the photoreceptor drum 30, and the developing unit 36BK in which a black toner BK is contained, is provided on the most downstream section of the periphery of the photoreceptor drum 30. Color toner and the black toner BK which are contained in the developing units 36Y, 36M, 36C and 36BK, are widely used, and therefore, the explanation thereof is neglected.

The image forming apparatus has two copying modes, one of which is used for color image copying, and the other of which is used for monochrome image copying, and one of these copying modes is freely selected when a button provided outside of the apparatus is operated.

When the document D is a color image and the color copying mode is selected, processes of the image reading system A, the laser writing system B, and the image forming section C are operated by pressing the copying button so that a color image is formed. That is, when the image signal outputted from the image reading system A is inputted into the laser writing system B which is composed of a driving motor 31, a polygonal mirror 32, a semiconductor laser which is not shown in the drawing, a fθ lens, a correction lens, and the like, by control of CPU in the control section, the apparatus starts the copying operation. That is, the photoreceptor drum 30 is rotated clockwise as shown by an arrow, and is uniformly charged by the charger 35, and a yellow (Y) image corresponding to the image of the document is written by a laser beam of the laser writing system B in the image exposing section 55 so that an electrostatic latent image of the Y image is formed. The electrostatic latent image on the photoreceptor drum 30 is developed into a visible Y toner image by the method of reversal development using a Y toner in the developing unit 36Y. A D.C. and further an A.C. bias voltage are impressed upon a developing sleeve, in which a magnet roller is housed, in the developing unit 36Y, and noncontact development by two component developer which is a visualizing means, is conducted so that Y toner image is formed. The photoreceptor drum 30 on which Y toner image is formed, passes under the cleaning unit 39 which is retreated. The photoreceptor drum 30 enters the second rotation, and then the drum is charged by the charger 35, and a magenta (M) image is written on the drum by the laser beam of the laser writing system B so that an electrostatic latent image of the magenta (M) image is formed on the Y toner image. This latent image is developed into an M toner image by the method of reversal development by the developing unit 36M in which a magenta toner is contained. In the same way as the above described, a cyan (C) toner image and a black (BK) toner image are successively formed by superimposing one on the other.

On the other hand, when the document is a monochromatic image or a color image, and a monochromatic copying mode is selected, the photoreceptor drum 30 is uniformly charged by the charger 35, and scanning by the laser beam for the monochrome of the laser writing system B is conducted so that a latent monochrome image is formed. The bias voltage is not impressed upon the developing units 36Y, 36M, and 36C, and only the developing unit 36BK is operated so that the toner image of a black toner BK is formed.

A transfer sheet P which is fed by a sheet feed roller 41 one sheet by one sheet from a sheet feed cassette 40 in which the transfer sheet P is loaded, is fed to the photoreceptor drum 30 by a timing roller 42 which is operated in timed relation with the toner image on the photoreceptor drum 30. The toner image on the photoreceptor drum 30 is transferred on to the transfer sheet P by the transfer unit 37, and the sheet is separated from the photoreceptor drum 30 by the separator 38, and after that the sheet P is conveyed to the fixing unit 45 through the conveyance belt 44 under the condition that the toner image faces upward.

Transfer unit P which is fixed in the fixing unit 45 is delivered through a sheet delivering roller 46 to the outside of the apparatus. The photoreceptor drum 30 continues to be rotated, and the residual toner which remains on the photoreceptor drum without transferring is collected and cleaned by the cleaning unit 39 having a cleaning blade 39A which is released from withdrawal, and the photoreceptor drum 30 is prepared for the next copying operation.

Figure 4A:
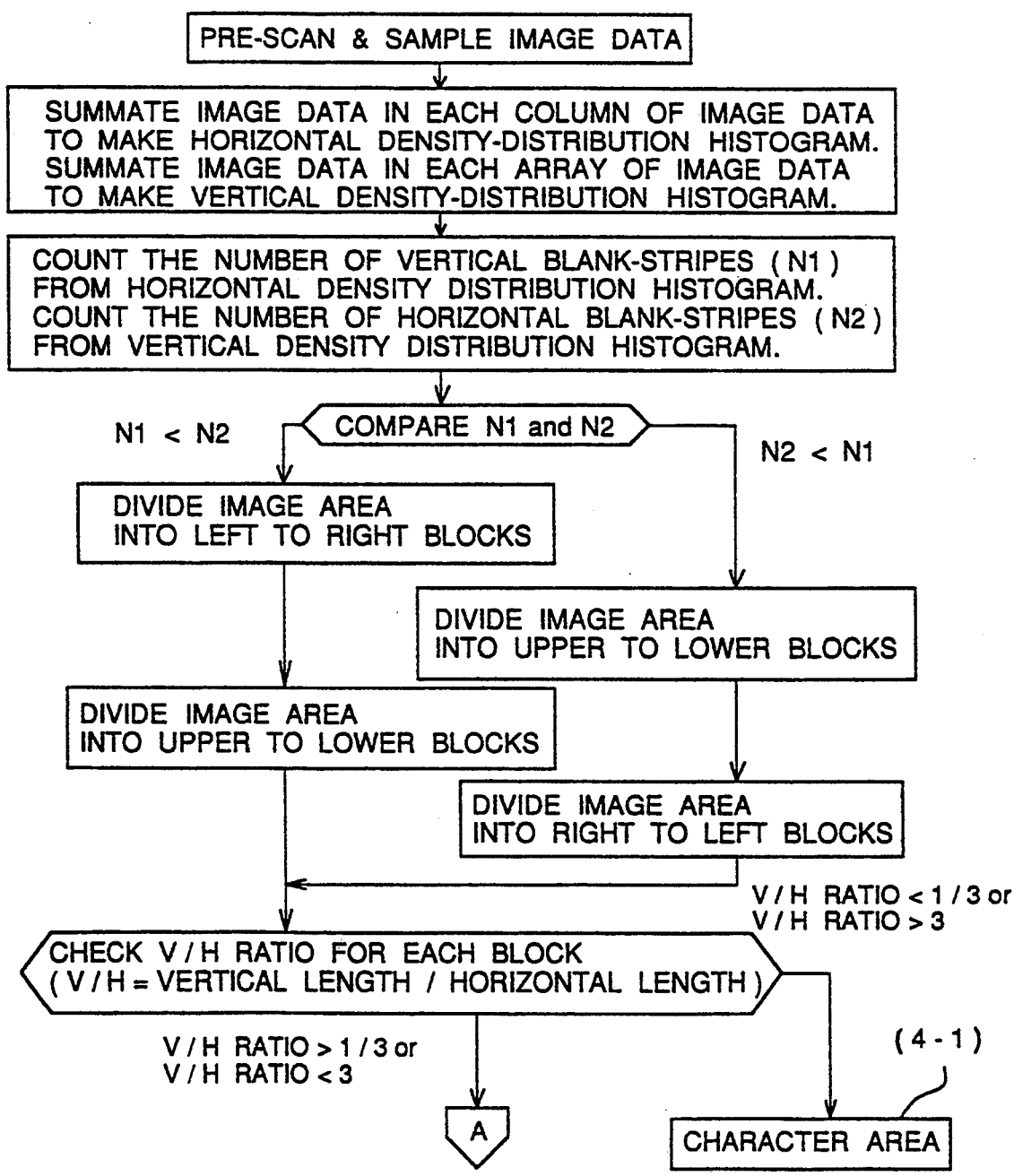
FIGS. 4A and 4B are flow charts of the present invention.
Figure 4B:
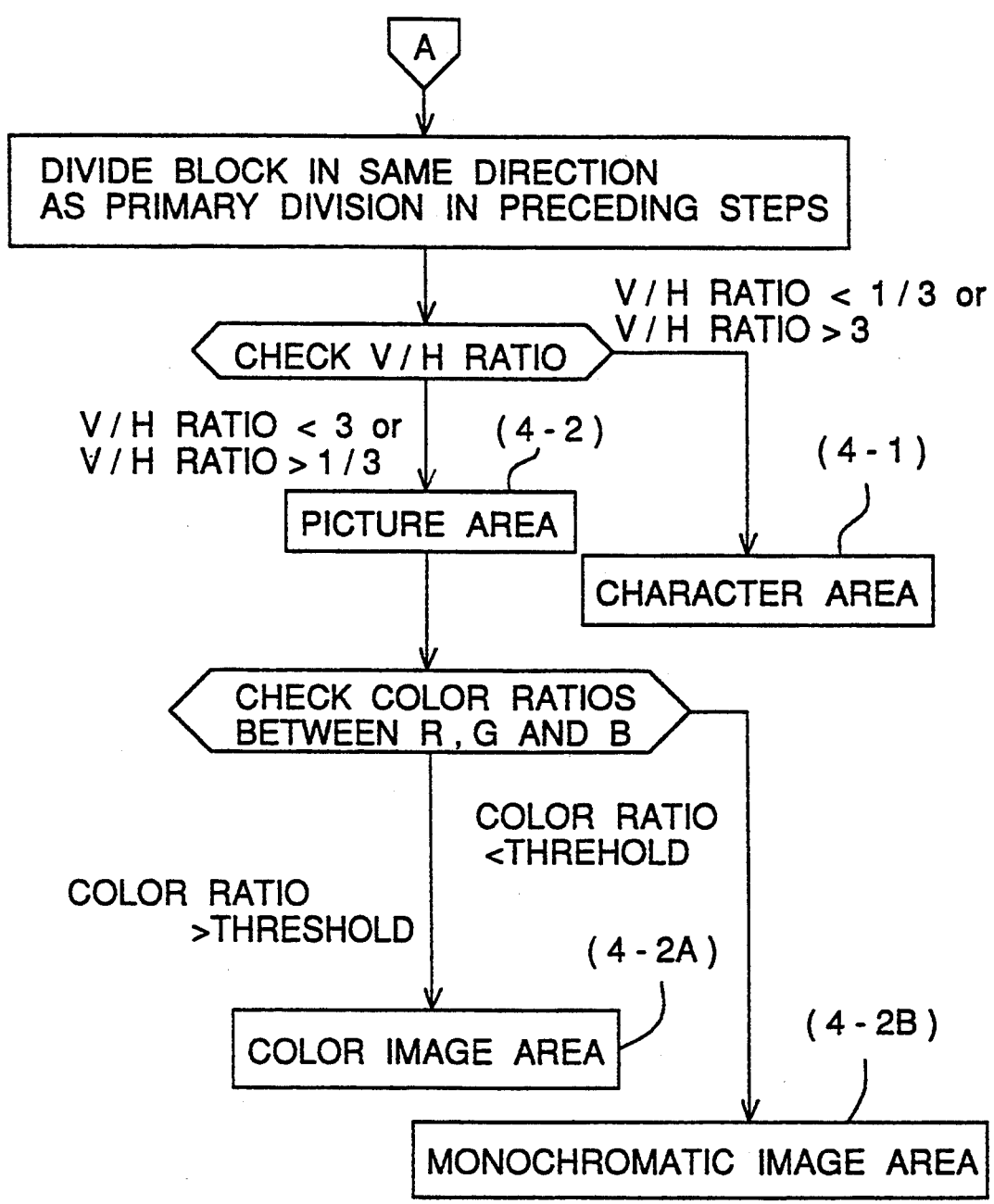

When the image processing apparatus of the present invention is incorporated in the color image forming apparatus which is structured and operated as explained above, the image forming apparatus conducts pre-scanning before the above described image forming process so that the document image is image-discriminated. When the copying button is pressed after the document D (for example, the document image as shown in FIG. 1-a) has been placed on the document placement section 11 and the color image copying mode has been set, pre-scanning is conducted, and at the same time, the image discrimination is conducted according to the flow charts as shown in FIGS. 4A and 4B. That is, the image discrimination is conducted in the following manner: the document image is divided by detecting the blank-stripes; a ratio of the length and width of a square region (block) which is obtained when dividing operations are repeatedly conducted, is calculated; and when the ratio is not less than a predetermined setting value 1 to 3, the region is discriminated as a character region (4-1), and when the ratio is not more than 1 to 3, the region is discriminated as a picture region. Further, B, G, R components are compared, and when the difference is large, the image is discriminated as a color image (4-2A). When the ratio of B, G, R components is the same in a constant level, the image is discriminated as a monochrome image (4-2B).

Reading information in the main scanning conducted after the pre-scanning is processed according to the discrimination in pre-scanning, and the image is exposed on the photoreceptor drum 30 from the image exposure section.

(1) As to the image region which is discriminated as a character region (4-1), the latent image is formed on the photoreceptor drum 30 by an image exposure prior to development by the developing unit 36BK, and after that BK development is conducted. Image exposure in the character region is $\gamma$-corrected so that $\gamma$ has a sharp slope.

(2) As to the image region which is discriminated as a color image region (4-2A), Y, M, C, BK images are exposed at each rotation of the photoreceptor drum 30. Four color toner images are superimposed on the photoreceptor drum 30 after each development has been conducted by developing units 36Y, 36M, 36C, and 36BK. The image exposure in the color image region is $\gamma$-corrected so that the image can be provided with gradation.

(3) As to the image region which is discriminated as a monochrome region (4-2B), the latent image is formed on the photoreceptor drum 30 by the image exposure prior to development by developing unit 36BK, and then BK development is conducted. The image exposure in the monochrome image region is $\gamma$-corrected so that the image can be provided with gradation.

The image data which is read out by the main scanning is modulated by one of the above-described methods (1), (2), (3), the image is exposed, and then the color toner image is formed on the photoreceptor drum 30 by development. The toner image formed as described above, is transferred by the transfer unit 37 onto the transfer sheet P which is fed from the sheet feed cassette 40 and is carried in timed relation with a timing roller 42. The transfer sheet P to which the toner image is adhered is fixed by the fixing unit 45 and delivered to the outside of the apparatus.

The image forming process has been explained as above when the color image copying mode is selected. When the monochrome image copying mode is selected, discrimination between a character region (4-1) and a picture region (4-2) is conducted at the time of the pre-scanning operation. The image processing apparatus section modulates the image data in the following manner: when the image is in the character region, $\gamma$ has a sharp slope, and when the image is in the picture region, $\gamma$ has a gentle slope so that the gradation can be reproduced.

EFFECTS OF THE INVENTION

An example in which an image processing apparatus of the present invention is applied to a color image forming apparatus by an electrophotographic method, has been explained as above. It is a matter of course that the present invention can be applied to a facsimile and the like. According to the present invention, optimum output can be obtained when the entire image is pre-scanned prior to the main scanning so that the characteristic of the image is selected, and thereby, a more accurate and more widely usable system can be realized as compared with the prior discrimination method at each pixel.

What is claimed is:

1. An image processing apparatus comprising: scanning means for:
preliminarily scanning an original image to obtain sampled image data of the original image; and
again scanning the original image to obtain original image data; judging means for judging from the sampled image data whether an area of the original image is one of a character image area and a picture image area;

said judging means including:

analyzing means for finding one of a horizontal and vertical blank-stripe zone in the area of the original image by analyzing the sampled image data that corresponds to the area of the original image; and dividing means for dividing the original image area into a plurality of image blocks by splitting the original image area having the one of the horizontal and vertical blank-stripe zones therein in one direction in which a number of image blocks to be formed by the dividing means is smaller than a number of image blocks that would be formed when the dividing means divides the original image area having the blank stripe zones therein in another direction different from the one direction, said judging means further judging whether each of the plurality of image blocks formed by the dividing means is one of a character image block and a picture image block based on said dividing means further dividing each of said plurality of image blocks to form a plurality of further divided image blocks and by an analysis by said analyzing means of a ratio between a horizontal length and a vertical length of each of said further divided image blocks; and processing means for processing the original image by selectively applying to the original image one of a character image processing operation and a picture image processing operation;

said processing means selecting the character image processing operation for processing the original image in each further divided image block judged by said judging means to be a character image block; and said processing means selecting the picture image processing operation in each further divided image block judged by said judging means to be a picture image block.

2. The apparatus of claim 1, wherein:

said judging means forms said sampled image data into first and second sets of image density distribution data;

the first set of image density distribution data representing an image density distribution along a horizontal scanning direction; and the second set of image density distribution data representing an image density distribution along a vertical scanning direction; and wherein said judging means further determines the blank-stripe zones based on the first and second sets of image density distribution data.

3. The apparatus of claim 1, wherein:

said scanning means performs a color separated scanning to obtain color image data which includes image density data for each color;

said judging means further determines whether an image in each of said plurality of further divided image blocks is one of a color image and a black and white image based on an analysis by said analyzing means of the image density data for each color; and said processing means further selects a processing mode to be one of a color-image processing mode and a black-and-white image processing mode based on a determination by said judging means that the original image is one of a color image and a black-and-white image.

4. A method for processing an image, comprising the steps of:

preliminarily scanning an original image to obtain sampled image data of the original image;

scanning the original image again to obtain original image data;

judging from the sampled image data whether an area of the original image is one of a character image area and a picture image area by:

analyzing the sampled image data to find one of horizontal and vertical blank-stripe zones in the original image area by analyzing the sampled image data that corresponds to the area of the original image; and dividing the original image into a plurality of image blocks by splitting the original image with the blank-stripe zones therein in one direction in which a number of image blocks formed by dividing the original image area having the blank-stripe zones therein is smaller than a number of image blocks that would be formed by dividing the original image area with the blank striped zones therein in another direction different than the one direction; and then further judging whether each of the plurality of image blocks formed by the dividing means is one of a character image block and a picture image block by said dividing means further dividing each of said plurality of image blocks to form a plurality of further divided image blocks, and said analyzing step further analyzing a ratio of a horizontal length and a vertical length of each further divided image block;

processing the original image by selectively applying thereto one of a character image processing operation and a picture image processing operation such that:

the character image processing operation is applied for processing the original image to each of the plurality of further divided blocks judged to be a character image block; and the picture image processing operation is applied for processing the original image to each of the plurality of further divided image blocks judged to be a picture image block.

5. The method of claim 4, wherein:

the judging step comprises forming the sampled image data into first and second sets of image density distribution data;

the first set of image density distribution data representing an image density distribution along a horizontal scanning direction; and the second set of image density distribution data representing an image density distribution along a vertical scanning direction; and the judging step further determines the blank-stripe zones based on the first and second sets of image density distribution data.

6. The method of claim 4, wherein:

the scanning step comprises a color separated scanning step to obtain color image data which includes image density data for each color;

the judging step further discriminates between a color image and a black-and-white image in each of the plurality of further divided image blocks based on an analysis of the image density data for each color; and the processing step further selects a processing mode to be one of a color image processing mode and a black-and-white image processing mode based on a discrimination result of the judging step.

* * * * *

UNITED STATES PATENT AND TRADEMARK OFFICE
CERTIFICATE OF CORRECTION

PATENT NO. : 5,369,507
DATED : November 29, 1994
INVENTOR(S) : TANAKA et al.

It is certified that error appears in the above-indentified patent and that said Letters Patent is hereby corrected as shown below:

Title page, Item [57] ABSTRACT, line 10 after "method", insert --changes--

Signed and Sealed this

Fifteenth Day of October, 1996

Attest:

BRUCE LEHMAN

Attesting Officer    Commissioner of Patents and Trademarks